(12) United States Patent
Suess et al.

(10) Patent No.: US 9,694,767 B2
(45) Date of Patent: Jul. 4, 2017

(54) CONFIGURATION SYSTEM OF A VEHICLE AND PROCESS FOR THE CONFIGURATION OF AT LEAST ONE CONTROL UNIT OF THE CONFIGURATION SYSTEM

(75) Inventors: Christian Suess, Vierkirchen (DE); Astrid Schroeder, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 2394 days.

(21) Appl. No.: 11/924,071

(22) Filed: Oct. 25, 2007

(65) Prior Publication Data

US 2008/0109237 A1    May 8, 2008

Related U.S. Application Data

(63) Continuation of application No. PCT/EP2005/004435, filed on Apr. 26, 2005.

(51) Int. Cl.
*B60R 16/023* (2006.01)

(52) U.S. Cl.
CPC ................. *B60R 16/0231* (2013.01)

(58) Field of Classification Search
CPC .................................. B60R 16/0231
USPC ........................................ 705/1.1
See application file for complete search history.

(56) References Cited

U.S. PATENT DOCUMENTS

| | | | |
|---|---|---|---|
| 6,505,100 B1 | 1/2003 | Stuempfle et al. | |
| 6,611,201 B1* | 8/2003 | Bishop et al. | 340/426.21 |
| 2002/0087240 A1 | 7/2002 | Raithel et al. | |
| 2004/0002799 A1* | 1/2004 | Dabbish | B60R 16/0231 |
| | | | 701/32.6 |
| 2004/0003799 A1* | 1/2004 | Bouffard et al. | 123/543 |
| 2005/0004726 A1* | 1/2005 | Paquet | 701/36 |

FOREIGN PATENT DOCUMENTS

| | | |
|---|---|---|
| DE | 100 00 337 A1 | 9/2001 |
| FR | 2 778 261 A1 | 11/1999 |
| WO | WO 00/58131 A1 | 10/2000 |

OTHER PUBLICATIONS

Bolic, Miodrag, et al. "Distributed Measurement and Control System Based on Microcontrollers with Automatic Program Generation." Sensors & Actuators: A. Physical, vol. 90, Jan. 1, 2001, pp. 215-221. EBSCOhost, doi:10.1016/S0924-4247(01)00526-X.*
Corresponding International Search Report dated Dec. 21, 2005 with English translation of relevant portion (Six (6) pages).

* cited by examiner

Primary Examiner — Carrie S Gilkey
(74) Attorney, Agent, or Firm — Crowell & Moring LLP

(57) ABSTRACT

A configuration system of a vehicle has at least one functional unit, a control unit pertaining to the functional unit, and a parametrizing unit provided in the vehicle, which is operatively connected with the control unit. The configuring system includes a storage device which can be read out by the parametrizing unit and which contains configuration information for the control unit, by which configuration information a parametrizing of the control unit can be carried out. The storage device additionally contains configuration information for the vehicle, in which case the storage device contains evaluation rules by which the parametrizing unit can determine configuration information for the configuration of the control unit from the configuration information for the vehicle and the configuration information for the control unit and can configure the control unit.

18 Claims, 1 Drawing Sheet

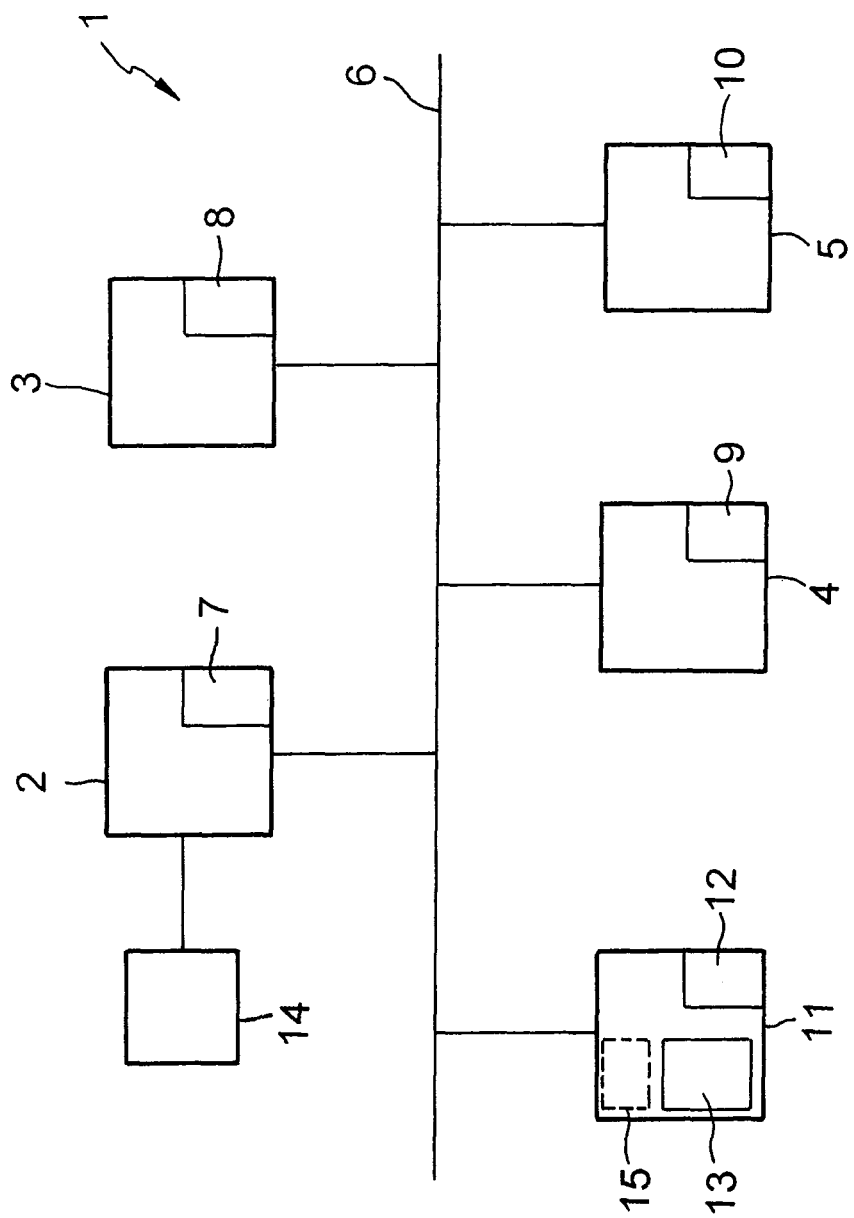

CONFIGURATION SYSTEM OF A VEHICLE AND PROCESS FOR THE CONFIGURATION OF AT LEAST ONE CONTROL UNIT OF THE CONFIGURATION SYSTEM

CROSS-REFERENCE TO RELATED APPLICATIONS

This application is a continuation of PCT International Application No. PCT/EP2005/004435, filed on Apr. 26, 2005, the entire disclosures of which are expressly incorporated by reference herein.

BACKGROUND AND SUMMARY OF THE INVENTION

The invention relates to a configuration system for a vehicle having at least a functional unit, a control unit pertaining to the functional unit, and a parametrizing unit which is provided in the vehicle and is operatively connected with the control unit. The configuration system also includes a storage device which can be read out by the parametrizing unit and contains the configuration information for the control unit, by which a parametrizing of the control unit can be carried out.

Furthermore, the invention relates to a process for configuring at least one control unit of a vehicle configuration system, which control unit is part of the functional unit. The configuration takes place independently of the manufacturing process of the vehicle by way of a parametrizing unit installed in the vehicle.

A configuration system according to the above-mentioned type normally has a plurality of functional units, which can be controlled by way of pertaining control units. Functional units in a vehicle are, for example, drive motors, a window wiper system, a window raising mechanism, an air-conditioning system, or the like. Each of these functional units is controlled by an associated electronic control unit. For this purpose, the associated control unit processes corresponding parameters characterizing the respective functional unit, in order to, for example, take into account country-specific differences. Thus, for example, in the case of vehicles delivered into the USA, the speed is indicated in mph, whereas it is indicated in km/h in other countries. In the case of a window wiper system, among other things, the weight of the wiper blade holding mounts and the maximal wiping speed are taken into account in order to ensure a troublefree and optimal operation of the window wiper system.

The configuration system described in German patent document DE 100 00 337 A1 includes a parametrizing unit, which is installed in the vehicle and is operatively connected with the control unit in order to make a parametrization of subsequently installed control units by way of external parametrizing units in a correspondingly equipped shop superfluous. In the parametrizing unit, for example, in a non-volatile memory, sets of parameters are stored for functional units installed in the vehicle during the production process, as well as for other functional units which can be installed in the vehicle after the vehicle is manufactured. A corresponding set of parameters belongs to each functional unit. The control unit belonging to the respective functional unit has to process these parameters in order to ensure a proper functioning.

After the exchange of one or more functional units and/or control units, the parametrizing unit of German patent document DE 100 00 337 A1 is suitable for parametrizing the respective control unit as a function of its pertaining functional unit at any operating point in time of the vehicle. In this case, the parametrization takes place such that the parametrizing unit checks, at regular defined intervals, whether the functional units and their associated control units are still intact, in which case, after the diagnosis of a new or defective control or functional unit, the corresponding control unit is newly parametrized. The parametrization therefore takes place on the basis of a variance comparison.

The disadvantage of the configuration system described in German patent document DE 100 00 337 A1 consists of the fact that, during the installation of the parametrizing unit and, in particular, the storage of corresponding sets of parameters, the pertaining functional units and/or control units and their function must already be known. In other words, it is only possible at high expenditures to parametrized functional units and/or control units which are not known to the parametrizing unit. In this case, parametrization has to be carried out in the conventional manner by way of special tools from the outside in a correspondingly equipped shop.

It is, therefore, an object of the present invention to suggest a configuration system according to the invention and a corresponding configuration process by which a simple configuring, particularly a parametrizing, of control units becomes possible.

According to the invention, this is achieved by a configuration system of a vehicle, having at least one functional unit, a control unit associated with the functional unit, and a parametrizing unit provided in the vehicle and operatively connected with the control unit. A storage device which can be read by the parametrizing unit and which contains configuration information for the control unit is provided by which configuration information a parametrizing of the control unit can be carried out. The storage device additionally contains configuration information for the vehicle. The storage device contains evaluation rules by which the parametrizing unit can determine configuration data for the configuration of the control unit from the configuration information for the vehicle and the configuration information for the control unit, and can configure the control unit.

In the case of a configuration system of the above-mentioned type, it is provided according to the invention that, in addition to the configuration information for the control unit, the storage device also includes configuration information for the vehicle and contains evaluation rules by which the parametrizing unit can determine configuration data for the configuration of the control device from the configuration information for the vehicle and the configuration information for the control unit and can configure the control unit.

This permits a fully automatic configuration of a control unit included in the configuration system without external tools. Within the scope of the present specification, the term "configuration" indicates a parametrization or an initialization, or a combination of both. The term "control unit", as used in the present specification, may represent a software function or a physical control device.

The fully automatic configuration is permitted by providing evaluation rules, which allow an automatic interpretation of the configuration information for the control unit as well as for the vehicle. The configuration information for the control unit includes sets of parameters which comprise all parametrizing and/or initializing possibilities of a control unit. A configuration of the control unit can take place in connection with the configuration information for the vehicle, which describes the vehicle in detail and may also be called "vehicle context". This information includes, for example, information concerning an equipment or country configuration of the vehicle.

The automatic configuration can already be utilized during manufacturing of the vehicle. However, the automatic configuration will also have advantages when a control unit and/or a functional unit are exchanged or are subsequently newly installed in the vehicle. Such a parametrizing unit permanently installed in the vehicle thereby permits a reliable, fast and flexible configuration of control units to be installed in the vehicle and belonging to corresponding functional units.

The operative connection between the parametrizing unit and the control unit is advantageously constructed in the form of a data bus.

In an expedient further development, the configuration system includes a sequence control unit, which controls and monitors the sequence of the configuration of the control unit. The sequence control unit ensures that the configuration of a control unit and/or of a functional unit can take place fully automatically. For example, a correct sequence during the configuration of a plurality of control units is taken into account. The sequence control unit can also take conditions into account.

It is particularly useful for the sequence control according to a further development to be set up for detecting states, conditions, and/or trigger signals of the configuration signal. A trigger signal could, for example, be the installation or the updating of a control unit and/or functional unit. The trigger signal could be combined with different vehicle states, so that a configuration can take place during the manufacturing at different points in time. The sequence control can be networked with additional systems, such as a system for determining position (Global Positioning System GPS). In this case, information is defined as a trigger signal, for example, as a function of the geographic location, and is recognized by the parametrizing unit. For example, the configuration of a control unit could take place only when the configuration of another control unit has already been concluded.

In another expedient further development, it is provided that the configuration information for the control unit, the configuration information for the vehicle, and the evaluation rules are stored in a generic format in the storage device. The providing of these data in a generic format makes it possible to exchange data in a simple manner, to change them or to otherwise verify them. The processing of these data takes place with the aid of the evaluation rules, which are also present in a generic format, so that they can be adapted or changed at a defined point in time. It thereby becomes possible to make available all data resources required for the configuration in an economical and scalable manner whereby these can also be used on small microcontrollers.

Another further development provides that the configuration information includes conditions with respect to a parameter value, a course of the control unit, an initial operating step, and/or the presence of another control unit, which have to be met for carrying out a parametrization and/or initialization. It is thereby ensured that the automatic configuration can be carried out in an orderly and correct manner.

Furthermore, it is advantageous for the storage device to include a memory arranged in the control unit for receiving configuration information for the control unit and/or the evaluation rules. The storage device therefore does not necessarily have to be a central storage device. On the contrary, it may be advantageous to provide the configuration information directly concerning the control unit in the control unit itself. This has a favorable effect particularly on the later installation of control units because information of a centrally arranged memory of the parametrizing unit does not have to be changed or updated. According to this further development, evaluation rules, which particularly concern the control unit, are also provided in the storage device of the control unit. As a result, when a control unit is later installed, adaptations of the parametrizing unit will not be necessary. All information required for the configuration of a control unit is stored in this control unit itself.

Furthermore, it can be provided that the storage device includes a memory arranged in the parametrizing unit for receiving configuration information for the vehicle and/or the evaluation rules. According to this further development, a centralized approach is provided according to which the information required for the configuration of the control units is arranged in a central storage device of the parametrizing unit.

According to another embodiment, the parametrizing unit is constructed as at least one central control unit. The configuration system may be a client/master system. In this case, a central control device operating as the master configures, that is, parametrizes and/or initializes the control units to be considered the client.

According to another variant, it is provided that the parametrizing unit is formed by the control unit itself. According to this variant, the configuring system is a so-called client/server system, in which the control units procure the configuration information from a central control device, the parametrizing unit, in order to carry out the evaluation themselves.

In the case of a process of the above-mentioned type for the configuration of at least one control unit of a configuration system of a vehicle pertaining to the functional unit, the following steps are carried out for the parametrizing of the control unit by the parametrizing unit: the parametrizing unit reads configuration information for the control unit out of a control device of the configuration system and evaluates the configuration information by way of evaluation rules contained in the storage device. The parametrizing unit identifies the configuration information lacking for a parametrizing of the control unit. It also reads the lacking configuration information out of the storage device and evaluates the lacking configuration information by way of the evaluation rules in order to carry out a parameterization of the control unit. This process permits a fully automatic and independent configuration of a control unit in a configuration system without external tools.

In a further development of the process according to the invention, the parametrization includes a determination of parameter values of the control unit, which are to be set, and the setting of corresponding parameter values. The determination of the parameters to be set includes taking into account a certain desired course of the control unit.

Furthermore, the parametrization includes an evaluation of conditions, so that the automatic configuration can take place in a correct manner.

For initializing the control unit, the parametrizing unit reads the configuration information for the control unit by way of evaluation rules from a storage device of the configurations system and evaluates it. The parametrizing unit also identifies the configuration information lacking for an initialization of the control unit. It reads the lacking configuration information out of the storage device and evaluates the lacking configuration information by way of the evaluation rules and carries out an initialization of the control unit.

It is also preferable for the configuration to be carried out individually for each control unit, in which case, as described above, states, conditions and/or trigger signals are taken into account for a configuration.

In a further development, it is provided that the configuration of the control unit is carried out by a central control unit (parametrizing unit), which detects the storage device with at least the configuration data for the vehicle. According to this preferred process, a configuration of the control unit takes place by a centrally arranged parametrizing unit which includes all data and information relevant to the evaluation.

According to another embodiment, it is provided that the configuration is carried out by the control unit itself, which reads the information lacking for a configuration out of a centrally available storage device and processes it. According to this approach, the configuration of the control units takes place in a decentralized manner, in which case a control unit requests the information which it lacks from a centrally available storage device.

In this case, it is preferable for the configuration and control to take place by a sequence control, which is capable of recognizing states, conditions and/or trigger signals. As a result, a fault-free configuration is ensured also of a plurality of possibly mutually dependent control units.

Other objects, advantages and novel features of the present invention will become apparent from the following detailed description of the invention when considered in conjunction with the accompanying drawings.

BRIEF DESCRIPTION OF THE DRAWING

The FIGURE is a schematic view of an electronic configuration system 1 of a vehicle.

DETAILED DESCRIPTION OF THE DRAWING

Referring to the FIGURE, the configuration system 1 includes a plurality of control units 2, 3, 4, 5, which are mutually connected by way of a data line 6 for the exchange of data. The data line is preferably constructed in the form of a data bus. A functional unit 14 is assigned to each of the control units 2, 3, 4, 5, which functional unit is controlled by the control unit. In the drawing of the FIGURE, for reasons of clarity, such a functional unit 14 is assigned only to control unit 2. The control units 2, 3, 4, 5 each have a memory 7, 8, 9 10 for storing at least configuration data for the respective control unit.

Furthermore, a parametrizing unit 11 representing a central control device is provided, which has a memory 12 in which, among other things, configuration information for the vehicle is stored. Furthermore, the memory 12 includes evaluation rules by which the parametrizing unit 11 can determine the configuration data relevant to a configuration of a respective control unit 2, 3, 4, 5. The interpretation and evaluation of the configuration information takes place with the aid of an evaluation unit 13, which is assigned, for example, to the parametrizing unit 11. In another embodiment, at least some of the control units may also have an evaluation unit. The parametrizing unit 11 also includes a sequence control unit 15, which may also be arranged in a distributed manner over the configuration system.

A configuration of a control unit includes a parametrization and/or an initialization of the control unit.

The parametrization is used for adapting functions by use of the description of an actual vehicle, which is also called a "vehicle context" or "vehicle profile". The vehicle profile includes, for example, information concerning the vehicle equipment, or vehicle-specific information, such as the country of delivery. Parametrization is used to avoid the need for a multiplicity of various control devices in order to save costs. As a result of the parametrization, functions are to be adapted to a concrete vehicle by the setting of parameter values. Furthermore, a certain desired course is to be activated. This may concern, for example, the handling of a sliding roof or of a convertible top.

Initialization is used for adapting a control unit to its actual environment by the implementation of initial operating steps. For example, within the scope of the initialization, a control unit is adapted to its physical environment; that is, calibrated. Examples would be a steer angle adjustment or a window lift mechanism initialization. The initialization could also represent the adaptation of two control units to one another. This is also called an adjustment. Such an adjustment could take place, for example, between an engine timing gear and a drive-away lock. Furthermore, the initialization has the object of initializing the setting of the course of a control device to a defined position, such as date or time of day.

By way of the invention, a configuration system and a process for configuring such a configuration system are provided which permit an automatic configuration, that is, parametrization and initialization of the control units. The invention is divided into the following sections.

The configuring information for a control unit is specified in a defined generic form or language. The configuring information for a control unit contains, among other things, conditions under which a certain parameter value of a control unit is to be set or a certain course or definition of a control unit is to be active. Conditions may, for example, be the presence of another control unit. Furthermore, the configuring information may also contain conditions which are required for the start of the operation, such as initial operating steps to be carried out. The special generic form or language, together with the evaluation rules also present in a general form, has the effect that the automatic configuration saves resources and can be scaled and can, therefore, also be used in control units with limited storage space.

The configuring information for a control unit is installed in the vehicle together with the control unit, for example, during the manufacturing or a retrofitting of the vehicle. For this purpose, the configuring information can be stored in an internal memory (see the FIGURE) of the storage unit or in the central memory of the parametrizing unit. In addition, a description of this concrete vehicle in the form of configuring information for the vehicle is also stored preferably in the storage device of the parametrizing unit. The configuring information for the vehicle may, for example, contain information concerning the vehicle equipment. In addition, the process permits the generating or recognizing of further configuring information concerning the vehicle, as required, dynamically from the configuration system, in that parameters of other control units are queried or in that the messages, which are exchanged between different control units on the data bus, are monitored.

The configuration of a control unit can be activated by certain trigger events. The process can thereby be configured such that it starts its sequence with the occurrence of certain events or a combination of events. Trigger events may, for example, be the installation or the updating of a control unit. Under certain circumstances, this may take place in combination with certain vehicle states. A trigger event may be networked with additional systems, such as a system for determining the position (Global Positioning System). In this case, information, for example, from the GPS, is defined as a trigger event and is detected by the parametrizing unit. Subsequently, partial or total configurations may be triggered, such as an automatic reconfiguration with respect to country-specific adjustments when recognizing that the vehicle has driven across the border between two countries.

Certain states or conditions are assigned to each control unit which should exist or be met, so that the parametrization or initialization of this control unit may be started or the starting makes sense. A start that is too early may result in a faulty configuration when assignments for configuration information are known only at a later point in time and, for example, a control unit has to wait for another control unit to be brought in because the parameter assignment of the latter is a component of the former's configuring information.

The configuration system includes a sequence control which, in the embodiment, is, for example, arranged in the parametrizing unit. The sequence control detects whether the necessary states or conditions for a control unit have occurred and only then clears the control unit for a configuration. The sequence control is capable of detecting the trigger events. If such a trigger event or several events occur(s), the sequence control triggers the parametrization and/or initialization of the control unit. Under certain circumstances, this can take place as a function of whether a control device is marked to be "ready for configuration". Depending on the type of trigger event, complete or partial parametrizations or configurations (for example, only the parametrization of an updated function and of the control units depending thereon) are triggered. In this case, the sequence control recognizes dependencies between control units with respect to the parametrization, which also includes time-related dependencies.

The configuration of a control unit includes a parametrization and a subsequent initialization. The sequence of the parametrization is as follows: If the parametrization for a control unit is triggered, first the configuration information pertaining to the function is read in (for example, from the memory contained in the control unit) and it is determined by the control unit which information has to be collected for the parametrization from which control units and/or the parametrizing unit. After the collection of this information, conditions and/or states are evaluated, and the parameter values to be set or the course of the function to be activated are determined in this manner. As illustrated in the FIGURE, this can take place centrally by the parametrizing unit. However, this operation could also be carried out by a respective control unit itself. Finally, the parameter values are set or the corresponding course is activated.

The sequence of the initialization is as follows. When the initialization for a control unit is triggered, first the configuring information pertaining to the control unit is read in and it is determined which information has to be collected for the initialization of other control units and/or the parametrizing unit. After the collection of this information, the conditions and/or states are evaluated and the initial operating steps to be carried out are determined in this manner. These steps are then implemented. As already illustrated with respect to the parametrization, this can take place centrally by way of the parametrizing unit or the respective control units.

The configuration system also has the advantage that an interface is provided for the diagnosis of the configuration (parametrization and/or initialization). By way of the latter, statuses, progress information, faults, etc. can be recognized among others.

The configuration of the control units can take place in various topologies of the configuration system. The configuring, parametrizing or initializing system can, therefore, be designed as a so-called client/master system. In this case, a central control device (the so-called master) configures, that is, parametrizes or initializes, the control units called clients.

The configuring system could also be designed as a so-called client/server system. In this case, the control units (clients) collect the configuring information from a central control device, which is called a server. Such a situation is illustrated in the FIGURE of the embodiment. This is characterized in that the respective control units each have a memory for configuring information concerning themselves as well as for evaluation rules. In addition, an evaluation unit is then necessary for interpreting the evaluation rules.

In addition to a two-layer hierarchy, the configuration system can also be organized on more layers. For example, a central master configures a number of submasters or controllers which, in turn, configure client functions. In this case, the hierarchization can be oriented according to domains; that is, for example, one controller respectively is provided in an entertainment subsystem, in a safety subsystem, in a drive subsystem or in a vehicle body subsystem, etc.

In order to provide a process which saves resources and can be scaled and can, therefore, also be used for control units with small memories and processors, various implementations are contemplated. Preferably, a modularization of the configuration system takes place. The format or the language in which the conditions are specified contains, among other things, comparison predicates, such as $=, >, <$, quantors, such as "exists", as well as Boolean operators, such as AND, OR, NOT. The specification language can be implemented, for example, as a simplified subset of a proportional calculus or a first-order predicate logic. In this case, it is sufficient for only one subset to be selected because not all possibilities of the predicate logic are required. In order to save resources, it is expedient to select in each case only the smallest required subset. The XML-language can be used as the technical format, so that the specification of the language can also be modularized.

The evaluation unit (parsers and evaluators) for the comparison predicates and also the Boolean operators is preferably implemented in a modular fashion; that is, there is an independent medium for each operator. "Independent" in this context means that an absence or a removal of the module from the control unit has no effect on the modules with the other operators or the operability of the entire evaluation unit.

If a control unit is updated later, for example, during a servicing of the vehicle, the evaluation unit for this control unit, as required, is also dynamically updated. This can take place by object-oriented mechanisms, such as overloading or polymorphism. The module(s) for the newly added operator(s) fit dynamically into the framework of the evaluation unit. Thus, on the one hand, only the respectively minimally required quantity of resources is required, while, on the other hand, an optimal expansion capability can be achieved at any point in time.

As an alternative, during updating of a control unit, for example, during the servicing of the vehicle, a new expanded version of the evaluation rules can also be recorded. The fitting version can be generated, for example, on a so-called tester during the servicing in that the preprocessor is applied to the new configuring information. As an alternative, all versions can be provided to the evaluation unit, so that a test program with respect to the operators present in the configuring information emits the fitting version of the parser.

The present invention permits the automatic configuration of control units of a configuration system without external tools. The process permits a high efficiency and stability of the processes during the development, as well as in the production and in the servicing and, in addition, reduces the logistic expenditures. It is also ensured that the expenditure of the changes is low. Another advantage consists of a high stability of the control units mutually communicating in a configuration system. Furthermore, standardized software modules are permitted. It is an advantage that a new (partial) function or a new wiring component is automatically detected. The latter is automatically parametrized without the aid of external tools. If the implementation of initial operating steps is required for the start of the operation, the new (partial) function or the wiring component is automatically initialized.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for configuring a plurality of control units of a configuration system of a vehicle, the plurality of control units configured as one or more processors for controlling a corresponding plurality of functional units of the vehicle, wherein the plurality of functional units are each operable in a plurality of different configurations, wherein the configuration process takes place independently of a manufacturing process of the vehicle by way of a parametrizing unit installed in the vehicle, wherein the parametrizing unit is configured as one or more processors, the process comprising the acts of:
   reading, by the parametrizing unit, configuration information for the plurality of control units out of corresponding storage devices arranged in each of the plurality of control units and evaluating it by use of evaluation rules and vehicle context information, wherein said configuration information comprises sets of parameters which correspond to parametrizing and/or initializing possibilities of the plurality of control units;
   identifying by the parametrizing unit the configuration information lacking for a parametrizing of at least one of the plurality of control units;
   reading, by the parametrizing unit, the lacking configuration information out of the corresponding storage devices of the at least one of the plurality of control units; and
   parametrizing the at least one plurality of control units via the parametrizing unit by evaluating the lacking configuration information by way of the evaluation rules such that the at least one plurality of control units operate associated ones of the plurality of functional units in a particular one of the plurality of different configurations in which each of the respective functional units is capable of operating.

2. The process according to claim 1, wherein the parametrization comprises a determination of parameter values of the plurality of control units to be set and the setting of corresponding parameter values.

3. The process according to claim 2, wherein the configuration is carried out individually for each of the plurality of control units.

4. The process according to claim 2, wherein the configuration is carried out by one of the plurality of control units, which reads the information lacking for a configuration out of a centrally available storage device and processes it.

5. The process according to claim 1, wherein the parametrization comprises an evaluation of conditions.

6. The process according to claim 1, wherein the parametrizing unit for initializing the plurality of control units further performs the acts of:
   reading out and evaluating configuration information for the plurality of control units by way of evaluation rules from the corresponding ones of the plurality of storage devices of the configuration system;
   identifying configuration information lacking for an initialization of the plurality of control units;
   reading the lacking configuration information out of the corresponding ones of the plurality of storage devices; and
   evaluating the lacking configuration information by way of the evaluation rules and carrying out an initialization of the plurality of control units.

7. The process according to claim 1, wherein the configuration is carried out individually for each of the plurality of control units.

8. The process according to claim 1, wherein the configuration is carried out by one of the plurality of control units, which reads the information lacking for a configuration out of a centrally available storage device and processes it.

9. The process according to claim 1, wherein the configuration and control takes place by a sequence control.

10. The process according to claim 1, wherein the vehicle context information comprises at least one of vehicle equipment information and country information for the vehicle.

11. A configuration system of a vehicle, comprising:
    a plurality of functional units which are each operable in a plurality of different configurations;
    a plurality of control units, each configured as one or more processors, to control corresponding ones of the plurality of functional units according to any one of their respective plurality of different configurations;
    a parametrizing unit, configured as one or more processors, arranged in the vehicle and operatively coupled with the plurality of control units;
    wherein each of the plurality of control units further comprises a storage device arranged therein which is readable by the parametrizing unit and contains configuration information for a corresponding one of the plurality of control units in which said storage device is arranged, the configuration information comprising sets of parameters which correspond to parametrizing and/or initializing possibilities of the corresponding control unit in which said storage device is arranged;
    wherein the parametrizing unit is further configured to utilize vehicle context information and evaluation rules, the evaluation rules being utilized by the parametrizing unit to determine configuration data for configuring the corresponding control unit from the vehicle context information and the configuration information for the control unit, whereby the parametrizing unit configures the plurality of control units, in accordance with the configuration data, to operate the corresponding plurality of functional units in a particular one of the plurality of different configurations in which each of the respective functional units is capable of operating.

12. The configuration system according to claim 11, further comprising a sequence control unit, which controls and monitors a sequence for configuring the plurality of control units.

13. The configuration system according to claim 12, wherein the sequence control is set up for recognizing states, conditions, and/or trigger signals of the configuration system.

14. The configuration system according to claim 11, wherein the configuration information for the plurality of control units, the vehicle context information, and the evaluation rules are stored in a generic format in the storage device for each of the corresponding control units.

15. The configuration system according to claim 11, wherein the configuration information comprises conditions with respect to a parameter value, a course of the plurality of control units, an initial operating step, and/or a presence of further control units, which conditions have to be met for carrying out at least one of a parametrizing and an initialization.

16. The configuration system according to claim 11, wherein the parametrizing unit is one of the plurality of control units.

17. The configuration system according to claim 11, wherein the vehicle context information comprises at least one of vehicle equipment information and country information for the vehicle.

18. A configuration system of a vehicle, comprising:
a plurality of functional units which are each operable in a plurality of different configurations;
a plurality of control units configured as one or more processors to control the plurality of functional units according to any one of their respective plurality of different configurations, wherein each of the plurality of control units includes a storage device arranged therein containing operating parameters corresponding to parametrizing and/or initializing possibilities of a corresponding one of the plurality of control units;
a parametrizing unit arranged in the vehicle and operatively coupled with the plurality of control units, wherein the parametrizing unit is configured as one or more processors, and wherein the parametrizing unit is configured to read the operating parameters from the storage devices of the plurality of control units, and wherein further the parametrizing unit is configured to use vehicle context information and the evaluation rules to configure the plurality of control units, in accordance with the corresponding operating parameters for each of the plurality of control units, to operate associated ones of the plurality of functional units in a particular one of the plurality of different configurations in which each of the respective functional units is capable of operating.

* * * * *